(12) United States Patent
Champaigne

(10) Patent No.: US 7,291,058 B2
(45) Date of Patent: Nov. 6, 2007

(54) METHOD AND APPARATUS FOR IMPROVING MEDIA FLOW

(75) Inventor: Jack Champaigne, Mishawaka, IN (US)

(73) Assignee: Electronics Inc., Mishawaka, IN (US)

( * ) Notice: Subject to any disclaimer, the term of this patent is extended or adjusted under 35 U.S.C. 154(b) by 546 days.

(21) Appl. No.: 10/819,728

(22) Filed: Apr. 7, 2004

(65) Prior Publication Data

US 2004/0259473 A1   Dec. 23, 2004

Related U.S. Application Data

(60) Provisional application No. 60/461,845, filed on Apr. 10, 2003.

(51) Int. Cl.
*B24B 1/00* (2006.01)
*B24C 9/00* (2006.01)

(52) U.S. Cl. .................. 451/38; 451/60; 451/99; 451/101

(58) Field of Classification Search .......... 451/36, 451/38, 39, 56, 60, 91, 99, 101; 72/53, 430
See application file for complete search history.

(56) References Cited

U.S. PATENT DOCUMENTS

| | | | |
|---|---|---|---|
| 1,743,057 A * | 1/1930 | Wienholz et al. ............. 125/21 |
| 2,224,505 A * | 12/1940 | Unger ......................... 451/93 |
| 2,678,130 A * | 5/1954 | Onstad et al. ................. 209/8 |
| 2,743,554 A * | 5/1956 | Dailey et al. ................ 451/78 |
| 2,924,911 A * | 2/1960 | Leliaert ....................... 451/89 |
| 3,609,465 A * | 9/1971 | Gruetzmacher et al. .... 361/149 |
| 3,778,678 A * | 12/1973 | Masuda .................... 361/233 |
| 4,463,502 A * | 8/1984 | Fitzgerald et al. ........... 34/249 |
| 4,680,900 A * | 7/1987 | Wadephul et al. ............. 451/2 |
| 2003/0153249 A1* | 8/2003 | Aoki .......................... 451/39 |

* cited by examiner

*Primary Examiner*—M. Rachuba
(74) *Attorney, Agent, or Firm*—Botkin & Hall, LLP

(57) ABSTRACT

The flow of media in shot peening, blast cleaning, and similar equipment is improved by applying a time varying magnetic field to the media to thereby degauss the media, allowing the media to flow through equipment without clogging and clumping due to magnetic attraction between the media.

10 Claims, 4 Drawing Sheets

METHOD AND APPARATUS FOR IMPROVING MEDIA FLOW

This application claims domestic priority based upon U.S. Provisional Patent Application Ser. No. 60/461,845, filed Apr. 10, 2003.

TECHNICAL FIELD

This invention relates to improving the flow of media in shot peening, blast cleaning, and similar equipment.

BACKGROUND OF THE INVENTION

Iron or steel granules, also called shot or grit, are used in abrasive blast cleaning, granite cutting, shot peening and other applications. The efficiency of such equipment depends upon media flowing freely through the apparatus and impacting upon the workpiece being treated. However, the flow characteristics of the media vary widely during operation of the equipment. Commonly, the media is directed against the workpiece and then collected and recycled through the equipment.

SUMMARY OF THE INVENTION

Such media materials are subject to magnetic remnance or memory which causes reduced flow capability because of the magnetic remnance or memory which causes reduced flow capability. This invention reduces or eliminates the effect of this magnetic influence and thereby improves the flow characteristics of the media. Media can become "magnetized" by a variety of methods, especially by impact with a surface. As this media is recycled through the machine during treatment of a workpiece, its remnace tends to increase and its ability to flow smoothly is reduced, sometimes to the point of complete blockage of the flow-regulating device or passages.

Other objects are also subject to magnetic remnance, the effect of which can be remedied by subjecting the object to an alternating electro-magnetic field available from, for instance, a coil of wire with multiple turns. Such a coil is commonly referred to as a de-gaussing coil and is used extensively to de-magnetize objects, such as screwdrivers or pliers. Degaussing works on the principle of application of a time-varying magnetic field initially at a sufficient level to cause magnetic dipole alignment. The magnitude of the time-varying magnetic field is reduced until the remnance is at or near zero. In the case of the screwdriver, one would insert the screwdriver into the center of the degaussing coil and slowly extract it. As the screwdriver is extracted, the influence of the de-gaussing coil is diminished, leaving the screwdriver in a de-magnetized state.

In this invention, the media is briefly submitted to an alternating magnetic field provided by a degaussing coil for a sufficient period of time that the magnetic remnance is reduced to a low (near zero) value. According to the invention, the magnetic field can either be applied to the media in bulk or can be applied to the media by continuously passing the media through the degaussing coil.

DESCRIPTION OF THE PREFERRED EMBODIMENT

Figure 1:
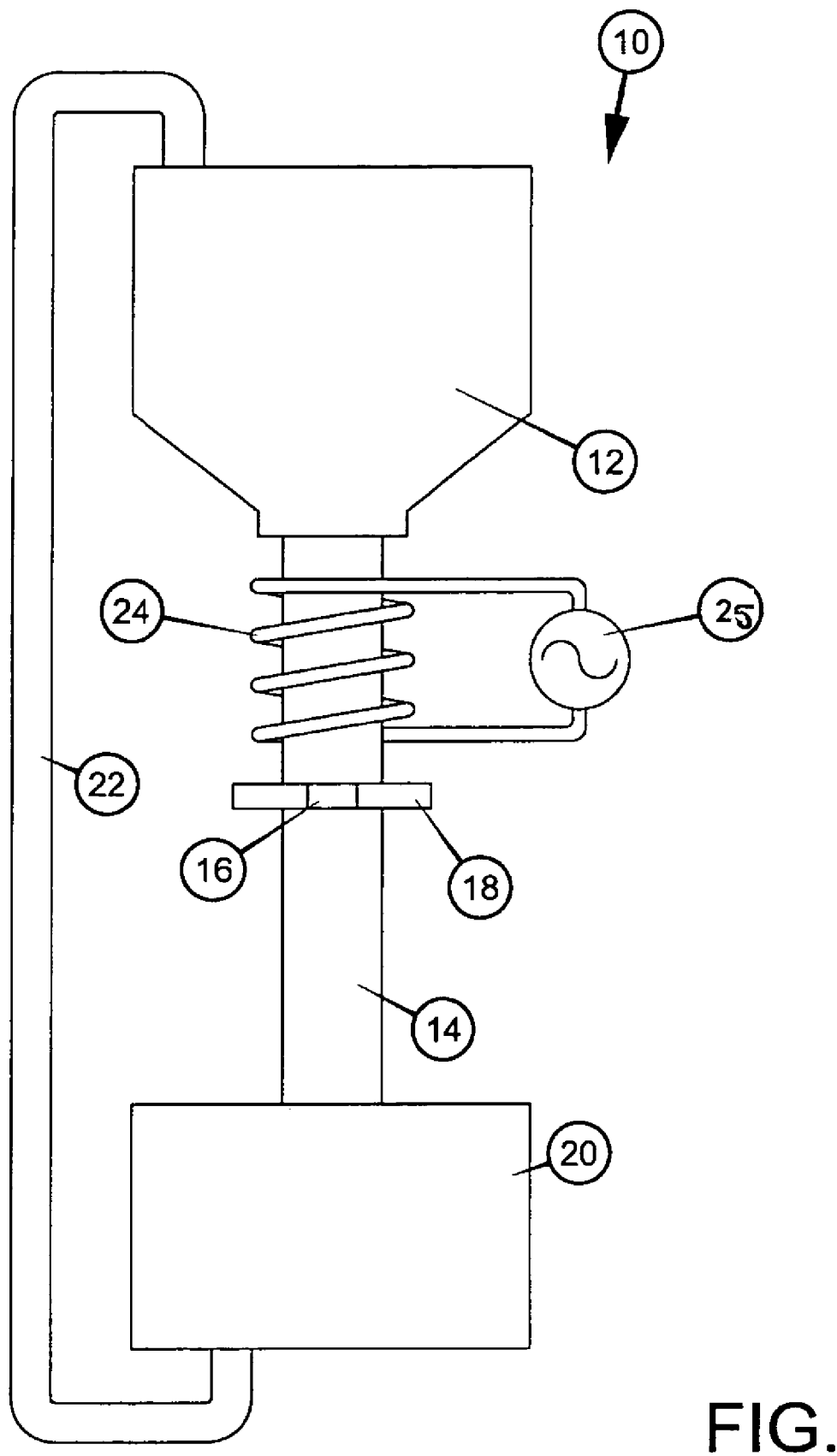
FIG. 1 is a schematic illustration of a typical shot peening or blast cleaning apparatus to which a degaussing coil of the present invention has been applied.

Referring now to FIG. 1, a typical shot peening or blast cleaning apparatus is generally indicated by the numeral 10. Media is stored in hopper 12 and then directed through a suitable flow path or conduit 14, which includes a regulating device, for example a fixed orifice 16 in an orifice plate 18. Typical size of the orifice 16 is, for example, 0.125" or 0.250". After the material passes through the orifice 16, the media enters treatment chamber 20, which includes, for example, a centrifugal throwing wheel (not shown) or a pneumatic blast nozzle (not shown), both of which are well known to those skilled in the art. The media impacts a target surface for its intended application and is then gathered in and resubmitted to the hopper 12 through return line 22.

As has been discussed above, it has been observed that impacts of the media with the target increase the tendency of the material to become "magnetized". Additional impacts due to recirculation of the media tend to further aggravate this condition. To alleviate this magnetic influence, a degaussing coil 24 is placed anywhere within the flow path. A preferred, but not mandatory, location for the location of the de-gaussing coil is immediately above the regulating orifice 18, as illustrated in FIG. 1. Other locations may be used and even multiple degaussing coils may be used at various locations within a single flow path. An alternating current power supply 25 supplies alternating current to the degaussing coil, thereby causing the degaussing coil to apply a time-varying magnetic field to the media flowing through the flow path 14, the average value of which is zero. The maximum strength of the magnetic field increases as the media enters the coil to a maximum midway through the coil and then diminishes. Although a degaussing coil has been illustrated, any alternating and diminishing magnetic field will accomplish the de-gaussing. For example, rotation of a small bar magnet could be employed which would present a magnetic field to the passing material and thereby cause the de-gaussing effect.

Figure 2:
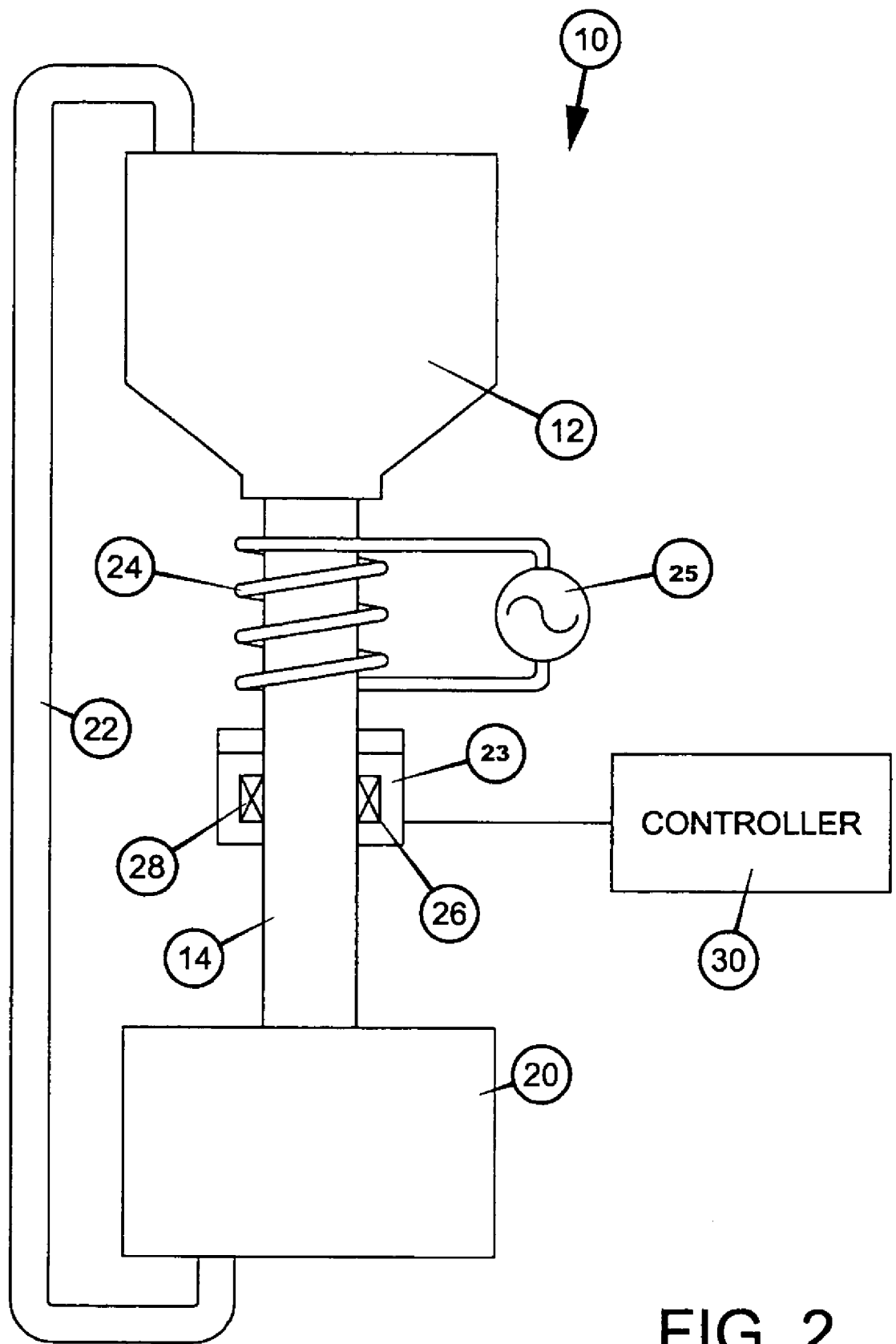
FIG. 2 is an illustration similar to FIG. 1, but illustrating another embodiment of the invention.

Referring now to FIG. 2, elements the same or substantially the same as the preferred embodiment retain the same reference numeral. In FIG. 2, a commercially available magnetic valve 23 replaces the orifice plate 18 and magnet(s) 26 and electromagnetic coils 28. Valve 23 is disclosed in U.S. Pat. No. 5,362,027, and is a normally-closed device restricting the flow of media caused by the influence of the permanent magnets. Application of an electrical current to electromagnetic coil 28 located within the valve causes a cancellation or neutralization of the permanent magnetic field and thus flow is allowed. The level of this signal determines the amount of net magnetic field and therefore the flow rate. When this level is set to achieve zero, or near zero, net magnetic field flow rate will be maximized. The degaussing coil 24 may be placed in flowpath 14 at either the inlet or outlet (or at both the inlet and outlet) of the magnetic valve and is designed to overcome not only the magnetization of the media by impact and recirculation, but also due to the effect of the permanent magnets within the magnetic valve 23 if a coil is placed at the outlet of the valve 23.

The de-gaussing can also be achieve by alteration of the neutral field current signal controlling the electromagnetic coil 26 within the valve 23 in a time-varying fashion. This can be accomplished by applying a complex electrical current to the coil 28. Accordingly, instead of applying a steady-state field condition, a dynamic time-varying field, is imposed on the steady state magnetic field. The average value of this time-varying portion of the field is zero, and thus the combination of the steady-state signal and the time-varying signal operates similar to just the steady-state signal alone except the presence of the time-varying portion of the signal performs a degaussing function. The steady-state portion of the signal is sufficient to provide the regulation of the flow rate of the media through the valve 23, while the time-varying portion of the neutral field signal is sufficient to effect the degaussing action desired. This technique has the advantage of not requiring an additional element such as the degaussing coil in order to achieve demagnetization.

Figure 5:
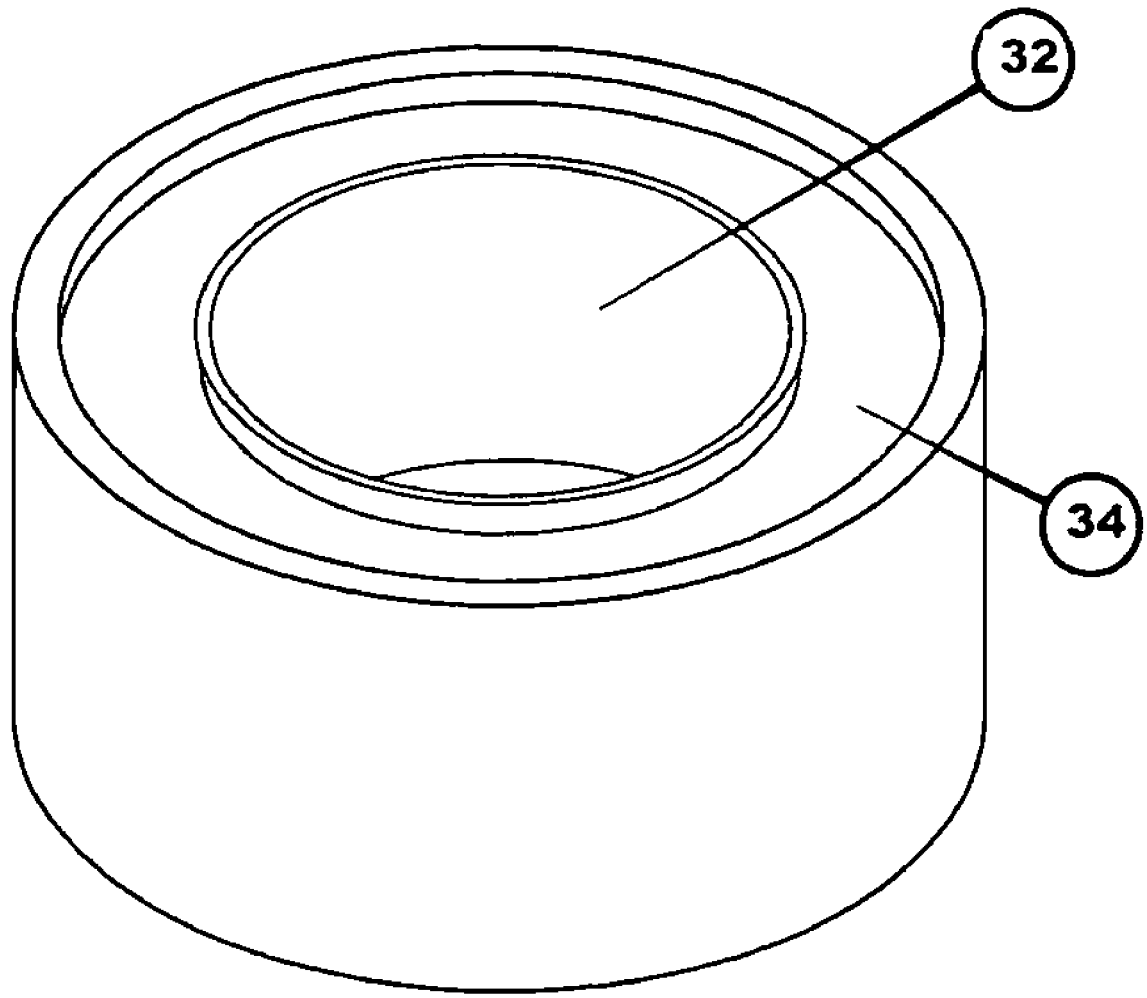
FIG. 5 is a view of a coil and a media container within the coil to illustrated bulk degaussing of the media pursuant to another embodiment of the invention.

Although continuous degaussing of the media as it flows through the flowpath is preferred, media may also be degaussed in bulk and then added back into the system. Referring to FIG. 5, a container 32 is filled with media into the system. Referring to FIG. 5, a container 32 is filled with media and placed within a coil 34. Current is applied to the coil to degauss the media in the container. The media is then returned to the hopper 12.

Figure 3:
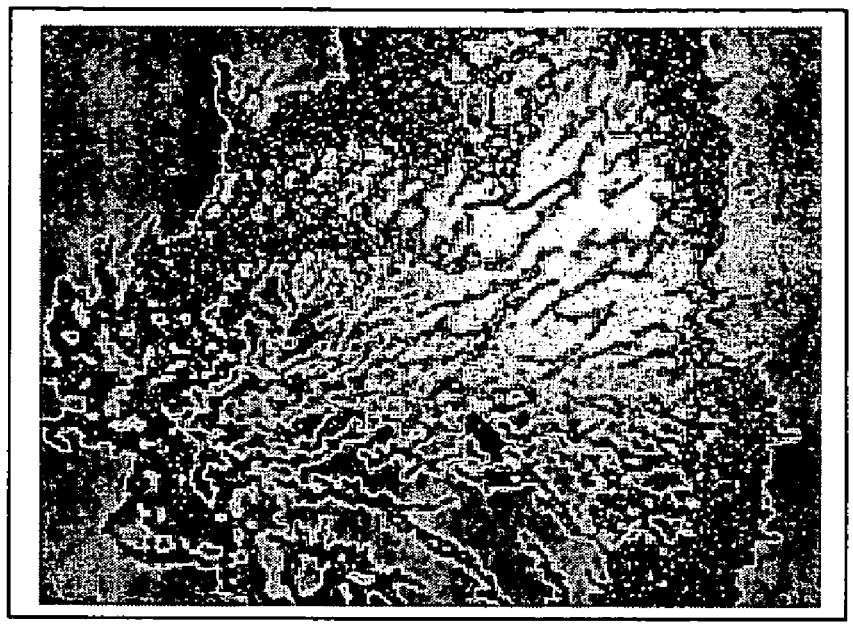
FIGS. 3 and 4 are microphotographs of media before and after treatment according to the present invention.
Figure 4:
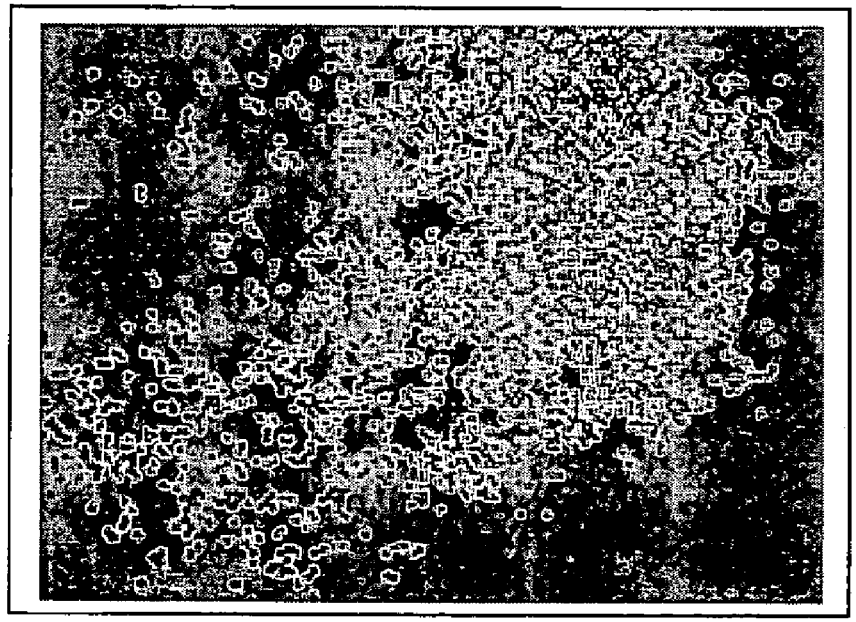

Referring now to FIGS. 3 and 4, the effects of degaussing can be seen on the media. FIGS. 3 and 4 are microphotographs of fine steel shot media, before and after degaussing respectively. Magnetized media exhibit "stringing", which is clearly present in FIG. 3. As shown in FIG. 4, the "strings" are absent from the degaussed media. The effects of degaussing media are also illustrated in Tables 1 and 2. Table 1 sets forth data with respect to a fine powder steel media, and Table 2 sets forth data for an industry standard "cut wire" shot. In both instances, the degaussed media exhibited substantially greater flow rates than either the magnetized media (which had been used in production), and the virgin media which had not been used in production and which was magnetized only to that extent occurring naturally in the manufacture and shipping of the media.

TABLE 1

Fine Powder

| | Magnetic Condition | Flow rate pounds/min |
|---|---|---|
| 0.250 orifice | virgin | 2.48 |
| | magnetized | 1.43 |
| | degaussed | 3.15 |
| 0.125 orifice | virgin | 0.47 |
| | magnetized | 0.19 |
| | degaussed | 0.50 |

TABLE 2

CW20 Shot

| | Magnetic Condition | Flow rate pounds/min |
|---|---|---|
| 0.250 orifice | virgin | 2.70 |
| | magnetized | 2.30 |
| | degaussed | 3.14 |
| 0.125 orifice | virgin | 0.34 |
| | magnetized | 0.26 |
| | degaussed | 0.37 |

The invention claimed is:

1. Method of optimizing flow of media used in shot peening, blast cleaning and similar apparatus by minimizing the magnetic attraction between the media by applying a time varying magnetic field to the media, said media being conveyed through a flow path extending between a media storage hopper and a treatment chamber, said method including the steps of removing a portion of said media, placing said portion of said media in a magnetic container, treating said media by applying a magnetic field to said container and to the media therewithin, and replacing said portion in said flow path.

2. Method of optimizing flow of media used in shot peening, blast cleaning and similar apparatus by minimizing the magnetic attraction between the media by storing said media in a hopper, dropping said media from said hopper and into a conduit, permitting said media to drop through said conduit and into a treatment chamber, accelerating said media in the treatment chamber and impacting said media on a target surface, recirculating media from said treatment chamber back into said hopper wherein said media is again stored in said hopper and dropped therefrom into said conduit, passing said media through a flow regulating device as the media passes through the conduit to limit flow of media through the conduit and into said chamber, and enhancing flow of the media in said conduit and through said flow regulating device by applying an alternating electrical signal to a magnetic coil wrapped around said conduit to thereby apply a time varying magnetic field to said media as it drops through said conduit to reduce magnetic remnance of the recirculated media due to impact of the media on the target surface.

3. Method of optimizing flow as claimed in claim 2, wherein said flow regulating device is an orifice in said flow path.

4. Method of optimizing flow as claimed in claim 2, wherein said flow regulating device is a magnetic valve responsive to application of an electric current to regulate flow of media through the flow path.

5. Method of optimizing flow as claimed in claim 4, wherein a steady state electrical signal is applied to a magnetic means within said valve to control flow of media through the valve and a time varying signal is imposed on the steady state signal to cancel magnetic remnance in the media.

6. Method of optimizing flow as claimed in claim 2, wherein said flow regulating device is a magnetic valve responsive to application of an electric current to regulate flow of media through the flow path and a separate magnetic coil surrounds said flow path offset from said magnetic valve, and applying a time varying electrical signal to said coil.

7. Media flow improvement apparatus comprising a hopper for storing and dispensing media, and media being dropped from the bottom of the hopper into a conduit communicating the bottom of the hopper with a treatment chamber, means in the treatment chamber for accelerating said media and impacting the media on a target surface, a return line connecting said treatment chamber with the hopper for returning media to the hopper after impact on the target surface, a flow control apparatus in said conduit between the hopper and the treatment chamber to limit flow of media through said conduit, a coil having multiple turns wrapped around said conduit, and an alternating current electrical source energizing said coil to apply a time varying magnetic field to said media in the conduit to reduce magnetic remnance of the media.

8. Media flow improvement apparatus as claimed in claim 7, wherein said flow control apparatus is a flow restricting orifice in said flow path.

9. Media flow improvement apparatus as claimed in claim 7, wherein said flow control apparatus is a magnetic valve responsive to application of an electric current to regulate flow of media through the flow path.

10. Media flow improvement apparatus as claimed in claim 7, wherein said flow regulating device is a magnetic valve responsive to application of an electric current to control magnets regulating flow of media through the flow path and a separate magnetic coil surrounds said flow path offset from said magnetic valve, and applying a time varying electrical signal.

\* \* \* \* \*